US008405238B2

(12) United States Patent
Dahlhaug (10) Patent No.: US 8,405,238 B2
(45) Date of Patent: Mar. 26, 2013

(54) WIND TURBINE WITH HYDRAULIC SWIVEL

(75) Inventor: Ole Gunnar Dahlhaug, Trondheim (NO)

(73) Assignee: Chapdrive AS, Trondheim (NO)

( * ) Notice: Subject to any disclaimer, the term of this patent is extended or adjusted under 35 U.S.C. 154(b) by 321 days.

(21) Appl. No.: 12/740,932

(22) PCT Filed: Oct. 29, 2008

(86) PCT No.: PCT/NO2008/000381
§ 371 (c)(1),
(2), (4) Date: Jun. 9, 2010

(87) PCT Pub. No.: WO2009/058022
PCT Pub. Date: May 7, 2009

(65) Prior Publication Data
US 2010/0320770 A1    Dec. 23, 2010

Related U.S. Application Data

(60) Provisional application No. 61/000,910, filed on Oct. 30, 2007.

(30) Foreign Application Priority Data

Oct. 30, 2007    (NO) .................................... 20075469

(51) Int. Cl.
*F03D 9/00*    (2006.01)
*H02P 9/04*    (2006.01)
(52) U.S. Cl. .......................................... 290/44; 290/55
(58) Field of Classification Search .................... 290/44, 290/55
See application file for complete search history.

(56) References Cited

U.S. PATENT DOCUMENTS

| 4,208,877 | A | * | 6/1980 | Evans et al. ...................... 60/495 |
| 4,280,061 | A | * | 7/1981 | Lawson-Tancred ............ 290/55 |
| 4,372,732 | A | * | 2/1983 | Browning ........................ 416/14 |
| 4,496,846 | A | * | 1/1985 | Parkins ............................ 290/44 |
| 4,496,847 | A | * | 1/1985 | Parkins ............................ 290/44 |
| 4,498,017 | A | * | 2/1985 | Parkins ............................ 290/44 |
| 4,503,673 | A | * | 3/1985 | Schachle et al. ................ 60/398 |
| 4,625,125 | A | * | 11/1986 | Kuwabara ........................ 290/52 |
| 5,467,598 | A | * | 11/1995 | Welscher ........................ 60/436 |
| 6,617,705 | B1 | * | 9/2003 | Smalser et al. ................. 290/42 |
| 6,672,843 | B1 | * | 1/2004 | Holder et al. ................. 417/201 |
| 6,911,743 | B2 | * | 6/2005 | Ishizaki .......................... 290/55 |
| 6,949,847 | B2 | * | 9/2005 | Tsutsumi et al. ............... 310/52 |
| 7,037,126 | B2 | * | 5/2006 | Tsutsumi et al. ............. 439/191 |
| 7,045,912 | B2 | * | 5/2006 | Leijon et al. .................... 290/42 |
| 7,146,810 | B1 | * | 12/2006 | Hauser et al. ................... 60/486 |

(Continued)

FOREIGN PATENT DOCUMENTS

| DE | 201 16 756 U1 | 2/2002 |
| EP | 1 555 441 A | 7/2005 |

(Continued)

*Primary Examiner* — Pedro J Cuevas
(74) *Attorney, Agent, or Firm* — Birch, Stewart, Kolasch & Birch, LLP (57) ABSTRACT

A wind turbine power production system with a closed loop hydrostatic transmission system for the transfer of mechanical energy from a wind turbine rotor to an electric generator. The hydrostatic transmission system comprises a closed loop with a pump and a motor connected by tubes or pipes. The assembly of the wind turbine rotor and the pump is arranged for rotating about a vertical axis above a swivel arranged for transferring fluid to and from the motor, fluid reservoir and other components arranged below the swivel.

10 Claims, 7 Drawing Sheets

U.S. PATENT DOCUMENTS

| | | | |
|---|---|---|---|
| 7,162,870 B1 * | 1/2007 | Hauser | 60/484 |
| 7,183,664 B2 * | 2/2007 | McClintic | 290/55 |
| 7,320,577 B1 * | 1/2008 | Holder et al. | 417/270 |
| 7,347,047 B1 * | 3/2008 | Hauser | 60/486 |
| 7,418,820 B2 * | 9/2008 | Harvey et al. | 60/487 |
| 7,436,086 B2 * | 10/2008 | McClintic | 290/55 |
| 7,474,013 B2 * | 1/2009 | Greenspan et al. | 290/53 |
| 7,498,685 B2 * | 3/2009 | Turner | 290/53 |
| 7,530,224 B2 * | 5/2009 | Fraenkel | 60/398 |
| 7,566,207 B1 * | 7/2009 | Holder et al. | 417/269 |
| 7,569,943 B2 * | 8/2009 | Kovach et al. | 290/44 |
| 7,656,055 B2 * | 2/2010 | Torres et al. | 290/55 |
| 7,683,500 B2 * | 3/2010 | Greenspan et al. | 290/53 |
| 7,728,454 B1 * | 6/2010 | Anderson, Jr. | 290/54 |
| 7,843,076 B2 * | 11/2010 | Gogoana et al. | 290/42 |
| 7,863,767 B2 * | 1/2011 | Chapple et al. | 290/54 |
| 7,911,074 B2 * | 3/2011 | Anderson | 290/54 |
| 7,932,620 B2 * | 4/2011 | Plant, Jr. | 290/55 |
| 7,938,622 B2 * | 5/2011 | Anderson, Jr. | 416/6 |
| 8,080,888 B1 * | 12/2011 | Daley | 290/43 |
| 8,093,736 B2 * | 1/2012 | Raftery | 290/42 |
| 8,106,527 B1 * | 1/2012 | Carr | 290/54 |
| 8,288,880 B2 * | 10/2012 | Olsen et al. | 290/40 C |
| 8,317,554 B1 * | 11/2012 | Williams | 440/5 |
| 2004/0067662 A1 * | 4/2004 | Tsutsumi et al. | 439/17 |
| 2004/0114994 A1 * | 6/2004 | Tsutsumi et al. | 403/164 |
| 2005/0155346 A1 | 7/2005 | Nikolaus | 60/398 |
| 2006/0210406 A1 * | 9/2006 | Harvey et al. | 417/334 |
| 2007/0024058 A1 | 2/2007 | McClintic | 290/44 |
| 2007/0138798 A1 * | 6/2007 | McClintic | 290/44 |
| 2008/0136186 A1 * | 6/2008 | Gogoana et al. | 290/43 |
| 2008/0260545 A1 * | 10/2008 | Frokjaer et al. | 417/212 |
| 2008/0296897 A1 * | 12/2008 | Kovach et al. | 290/44 |
| 2009/0021012 A1 * | 1/2009 | Stull et al. | 290/44 |
| 2009/0140522 A1 * | 6/2009 | Chapple et al. | 290/43 |
| 2010/0194115 A1 * | 8/2010 | Jakubowski et al. | 290/55 |
| 2010/0270809 A1 * | 10/2010 | Dahlhaug | 290/55 |
| 2011/0041490 A1 * | 2/2011 | Gogoana et al. | 60/484 |
| 2011/0148117 A1 * | 6/2011 | Bailey | 290/52 |
| 2011/0164985 A1 * | 7/2011 | Brown | 416/223 R |
| 2012/0161442 A1 * | 6/2012 | Chapple | 290/44 |
| 2012/0164001 A1 * | 6/2012 | Frokjaer et al. | 417/53 |
| 2012/0204563 A1 * | 8/2012 | Fiske | 60/639 |

FOREIGN PATENT DOCUMENTS

| | | |
|---|---|---|
| SE | 8005285 | 1/1981 |

* cited by examiner

WIND TURBINE WITH HYDRAULIC SWIVEL

This application is the National Phase of PCT/NO2008/000381 filed on Oct. 29, 2008, which claims priority under 35 U.S.C. 119(e) to U.S. Provisional Application No. 61/000,910 filed on Oct. 30, 2007 and under 35 U.S.C. 119(a) to Patent Application No. 20075469 filed in Norway on Oct. 30, 2007, all of which are hereby expressly incorporated by reference into the present application.

TECHNICAL FIELD

The invention relates to a turbine driven electric power production system with a closed loop hydraulic transmission system for the transfer of mechanical energy from a wind turbine to an electric generator. As opposed to conventional wind turbine systems comprising mechanical speed-up gears where the generator is arranged in the nacelle of the wind turbine power production system, the hydraulic motor, generator and other components in the present invention are arranged on the ground or close to the ground.

The location and weight of the drive train and the generator is becoming increasingly important for the installation and maintenance as the delivered power and the size of the wind turbine is increasing.

Considering that about 30% of the downtime for a conventional wind turbine is related to the mechanical gearbox, the weight of a 5 MW generator and the associated mechanical gear is typically 50 000 to 200 000 kg, and that the centre of the wind turbine rotor extends 100 to 150 m above the ground or sea level, it is easy to understand that the deployment and maintenance of conventional systems with mechanical gears and generator in the nacelle is both costly and difficult.

Wind turbine systems with a variable gear based on a hydrostatic transmission system between the wind turbine rotor and the electric generator is known from background art. The use of a hydrostatic transmission system allows for more flexible placing of the hydraulic motor and electric generator in the wind turbine power production system than with conventional technology where the placement of the components is restricted by the placement of the drive train and the gear box.

However, one of the main problems related to the location of the hydraulic motor and generator results from the fact that horizontal-axis wind turbines (HAWT) must be pointed into the wind by rotating the wind turbine around a vertical axis. With the hydraulic pump connected to and driven by the wind turbine rotor shaft, the arrangement of the hydraulic motor and electric generator on the ground would incur twisting of the tubes or pipes in the closed loop between the hydraulic pump and the hydraulic motor.

The present invention solves this problem by implementing a swivel that is arranged for transferring hydraulic pressure between the hydraulic pump above the swivel and the hydraulic motor below the swivel. The swivel may rotate any number of turns around the vertical axis, and no stop and start of the turbine rotor is required during normal operation for bringing the turbine back to its initial position. The present invention allows for most of the hydraulic components, including the fluid reservoir, the boost pump and the hydraulic motor to be arranged near the ground or close to the ground. The present invention also takes into account the handling of leakage oil that will usually increase with the power generated by the system.

A further advantage of the present invention is that the hydraulic pump and the top of the swivel are in a fixed angular position relative each other. The same is true for the lower connection of the swivel relative the hydraulic motor. The tubular members in the closed loop of the hydrostatic transmission system may therefore be made of shorter rigid tubes or pipes instead of longer flexible tubes as described above. The deployment of rigid tubes or pipes will reduce the elasticity in the system compared to deployment of flexible tubes.

BACKGROUND ART

In conventional wind turbine power production systems the energy from the wind is transferred mechanically, either directly or by a rotational speed-up gear to an electric generator.

The generator must rotate at a nominal speed to be able to deliver electricity to the grid or network connected to the power production system. If, during low wind speed conditions, the turbine is not supplying an appropriate level of mechanical torque to the system it will fail to deliver energy and instead the generator will act as an electric motor and the net will drive the generator and turbine through the mechanical gear.

On the other hand, if the wind is too strong the rotational frequency of the wind turbine rotor may become too high for the generator to operate properly or the mechanical apparatus could break down due to the strong forces.

Several solutions exist for overcoming the problems related to varying wind conditions. The most obvious solution is to stall and/or brake the turbine or pitch the turbine blades when the wind is too strong. Manual brakes and pitch control of the turbine blades are in use today, however, this solution may lower the efficiency of the system.

A well known solution from background art is the use of inverters to convert the output frequency of the electric generator to a desired frequency. The generator driven by the turbine will then be allowed to run at a variable rotational frequency depending on the wind speed. The use of inverters may be costly and may reduce the overall efficiency of the system.

It is known from background art that mechanical transmission systems based on planetary gears with variable gear ratio can be employed to maintain the generator rotational speed close to a desired value during varying wind conditions.

In U.S. patent application 2005/194787 and international patent application WO-2004/088132 a wind turbine where the transfer of energy from the turbine to the generator is mechanically gear driven is described. The gear ratio can be varied by varying the rotational speed and direction of the outer ring of the planetary gear. In these applications a hydrostatic transmission system is used for controlling the planetary gear.

It has been proposed in several publications to use a hydrostatic transmission system comprising a hydraulic pump and a hydraulic motor for transferring energy from the turbine to the generator. By employing a hydraulic pump and/or motor with variable displacement, it is possible to rapidly vary the gear ratio of the hydraulic system to maintain the desired generator speed under varying wind conditions.

Japanese patent application JP 11287178 by Tadashi, describes a hydraulic transmission system used for the transfer of energy from a wind turbine rotor to an electric generator where the generator speed is maintained by varying the displacement of the hydraulic motor in the hydrostatic transmission system.

Hydrostatic transmission systems allow more flexibility regarding the location of the components than mechanical transmissions.

The relocation of the generator away from the top portion of the tower in a wind turbine power production system removes a significant part of the weight from the top portion of the tower. Instead the generator may be arranged on the ground or in the lower part of the tower. Such an arrangement of the hydrostatic motor and the generator on the ground level will further ease the supervision and maintenance of these components, because they may be accessed at the ground level.

International patent application 94/19605A1 by Gelhard et al. describes a wind turbine power production system comprising a mast on which is mounted a propeller which drives a generator. The power at the propeller shaft is transmitted to the generator hydraulically. The propeller preferably drives a hydraulic pump which is connected by hydraulic lines to a hydraulic motor driving the generator. The hydraulic transmission makes it possible to locate the very heavy generator in a machinery house on the ground. This reduces the load on the mast and thus makes it possible to design the mast and its foundation to be lighter and cheaper.

U.S. Pat. No. 7,183,664 (McClintic) describes a wind turbine where a hydraulic pump pressurizes fluid and stores the fluid in a chamber in the support tower. Pressurized fluid is directed via a proportioning valve to a hydraulic motor which is coupled to an electric generator. The proportioning valve is controlled to maintain the rotational speed of the generator. At the top of the tower a hydraulic swivel couples the pump outlet to the high pressure chamber in the tower, and from a low pressure tank to the hydraulic pump. The low pressure fluid returns to the pump by using an inert pressurized gas in the low pressure tank.

DE 3025563 (Suzzi) describes a wind turbine with a closed loop hydrostatic transmission system comprising a hydraulic swivel. NO20041044 (Nikolaus)

Norwegian patent application NO22045083 (Bragstad) describes a swivel for transporting water under pressure from a water pump driven by a wind turbine rotor to a turbine for generation of electricity.

WO2006029633 (Andersen) describes a wind turbine comprising one or more pumps. The pumps are connected to a device for converting hydraulic pressure to a rotational movement to drive a generator. The pressure from the pump is controlled by a valve and a tank for pressure balancing. A device for compensation of rotational movement is used between the nacelle and the tower.

WO2007143902 and CN2911237 describes a swivel device.

It can be seen from WO2007053036 (Chapple et al) the energy transfer between a turbine rotor and an electric generator may be made more efficient by controlling the displacement of the hydraulic pump or motor based on one or more speed measurements, such as the wind speed.

In real-life hydraulic pumps and motors will always have a small leakage of fluid that has to be handled. For large installations the leakage can be considerably large, and has to be handled carefully.

A trend in the field of so-called alternative energy is that there is a demand for larger wind turbines with higher power. Currently 5 MW systems are being installed and 10 MW systems are under development. Especially for off-shore installations far away from inhabitated areas larger systems may be environmentally more acceptable and more cost effective. In this situation the weight and maintenance access of the components in the nacelle of the wind turbines is becoming a key issue. Considering that about 30% of the downtime for a conventional wind turbine is related to the mechanical gearbox, the weight of a 5 MW generator and the associated mechanical gear is typically 50 000 to 200 000 kg and that the centre of the turbine stretches 100 to 150 m above the ground or sea level, it is easy to understand that the deployment and maintenance of conventional systems with mechanical gears and generator in the nacelle is both costly and difficult.

Thus, there is a need for reducing the weight and the number of critical and heavy-weight components in the nacelle in wind turbine power production systems according to background art with a new and innovative solution that reduces the number of components in the nacelle and the need for deployment and maintenance of components in the nacelle. Further, a solution for handling the oil leakage occurring in pumps and motors is needed for such hydrostatic transmission systems to be successfully deployed in real-life systems. Efficient energy transfer from the wind turbine rotor to the generator during varying operational conditions represented by changing wind speeds and generator load should be considered.

SHORT SUMMARY OF THE INVENTION

The present invention is a solution to at least some of the abovementioned problems and comprises a wind turbine power production system with a closed loop hydrostatic transmission system for the transfer of mechanical energy from a wind turbine rotor to an electric generator wherein the hydrostatic transmission system comprises a closed loop with a pump and a motor connected by tubes or pipes, wherein the assembly of the wind turbine rotor and the pump is arranged for rotating about a vertical axis, above a swivel arranged for transferring fluid in the closed loop hydrostatic transmission system to and from the motor arranged below the swivel, the power production system further comprising a fluid reservoir arranged for storing additional fluid for the hydrostatic transmission system, where the swivel is further arranged for transferring leakage fluid from the pump to the fluid reservoir arranged below the swivel in a drain line.

The power production system may further comprise a booster pump below the swivel, arranged for pumping supplementary hydraulic fluid from the fluid reservoir to the hydraulic pump through a boost line, where the swivel is arranged for transferring fluid in the boost line.

According to an embodiment of the invention a gear ratio of the hydrostatic transmission system is controlled by a control system arranged for controlling a variable displacement of the hydraulic motor.

BRIEF DESCRIPTION OF DRAWINGS

The invention is illustrated in the attached drawing figures. The illustrations are meant to illustrate preferred and alternate embodiments of the invention, and shall not be construed to limit the scope of the invention which shall solely be limited by the attached claims.

EMBODIMENTS OF THE INVENTION

The invention will in the following be described with reference to the attached figures and will describe a number of embodiments according to the invention. It should be noted that the invention should not be limited to the embodiments described in this disclosure, and that any embodiments lying within the spirit of this invention should also be considered part of the disclosure.

Figure 1:
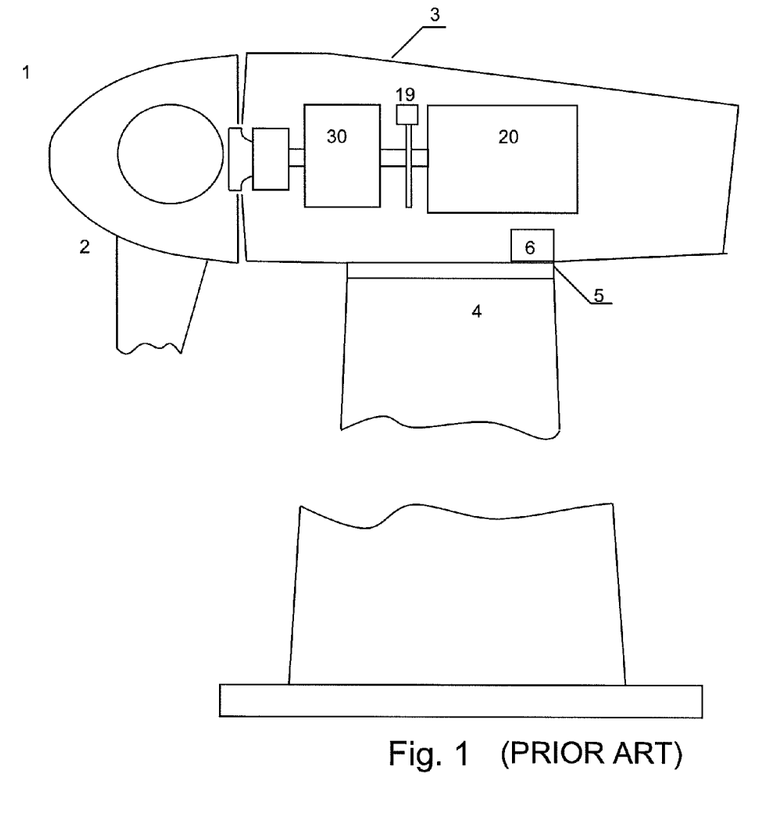
FIG. 1 illustrates a vertical section of a wind turbine power production system according to background art where a mechanical gear box and the generator are located in the nacelle.

Referring firstly to FIG. 1 of the drawings in which is shown a cross section view of a wind turbine power production system according to background art. The wind power production system (1) comprises a wind turbine rotor (2) with a mechanical gear box (30) and an electric generator (20) for the transfer of mechanical energy from the wind turbine rotor (2) to electric energy from the generator (20). The gear box (30) and the generator (20) are arranged in a nacelle (3) on the top of a tower (4) of known design. The nacelle is arranged on a rotating bearing (5) so that wind turbine rotor (2) and nacelle (3) can pivot at the top of the tower (4), where the yaw of the nacelle is controlled by a yaw control system (6). The main task of the yaw control system (6) is to continuously point the wind turbine rotor (2) into the wind (or away from the wind). Further it is well known to use disk brakes (19) to halt the turbine when required.

Figure 2:
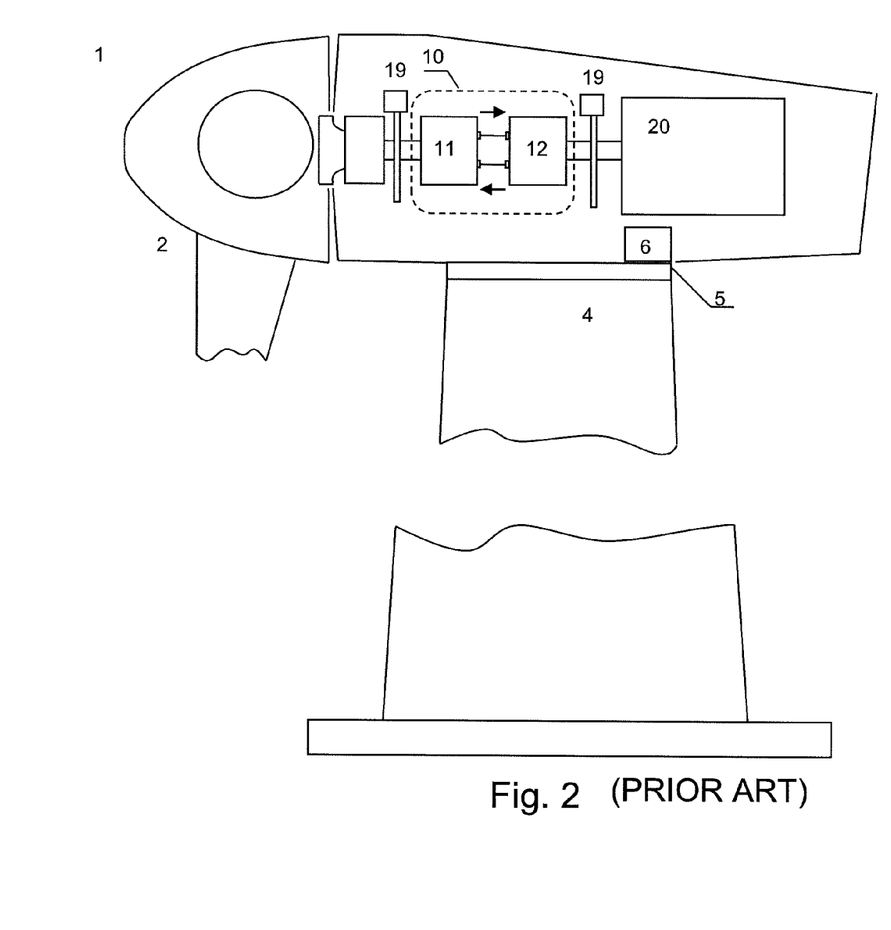
FIG. 2 illustrates a vertical section of a wind turbine power production system according to background art where a hydrostatic transmission system and the generator are located in the nacelle and the hydrostatic transmission system is used as a variable gear.

FIG. 2 illustrates a vertical section of a wind turbine power production system (1) with a hydraulic transmission system (10) used as a variable gear according to background art, for the transfer of mechanical energy from the wind turbine rotor (2) to electric energy from the generator (20). The hydrostatic transmission system comprises a hydraulic pump (11) and a hydraulic motor (12). The pump (11) and/or the motor (12) may be of the variable displacement type or fixed displacement type. However, in order to be able to control the gear ratio of the hydrostatic transmission system either the pump or the motor or both should be of the variable displacement type. Similar to FIG. 1 the nacelle is arranged on a rotating bearing (5) with a vertical axis so that the wind turbine rotor (2) and nacelle (3) can pivot at the top of the tower (4), where the yaw of the nacelle is controlled by a yaw control system (6). The main task of the yaw control system (6) is to continuously point the wind turbine rotor (2) into the wind (or away from the wind).

It is well known by the persons skilled in the art that the downtime of the mechanical gearbox used in systems according to background art as depicted in FIG. 1 may constitute as much as 30% of the downtime for a conventional wind turbine. In addition the weight of a 5 MW generator and the associated mechanical gear is typically 50 000 to 200 000 kg. When the centre of the turbine extends 100 to 150 m above the ground or above sea level, in the case of off-shore or near shore installations, it is understood by a person skilled in the art that the construction, deployment and maintenance of conventional systems with mechanical gears and generator in the nacelle is both costly and difficult.

Another major issue with the systems according to background art shown in FIGS. 1 and 2 is that the electrical power cables from the generator through the tower will be twisted when the turbine rotates around the vertical axis. After 2-3 turns in one direction the nacelle may have to be rotated back to its initial position. This may require a planned production stop and restart.

Figure 3:
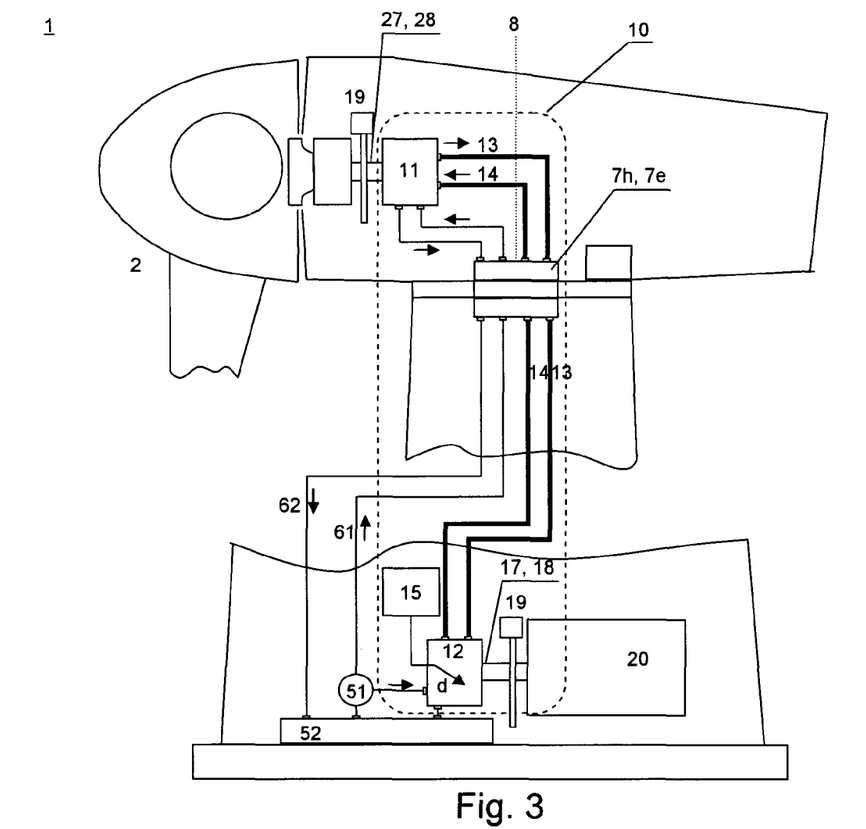
FIG. 3 illustrates a vertical section of a wind turbine power production system according to the invention where the hydraulic motor of the hydrostatic transmission system and the generator are located in the base of the tower or near the ground and a hydraulic swivel or union is arranged in the closed loop of the hydrostatic system to allow the nacelle to rotate about a vertical axis and thereby allowing the wind turbine to point into the wind continuously.

FIG. 3 illustrates a vertical section of a wind turbine power production system (1) according to the invention with a closed loop hydrostatic transmission system (10) for the transfer of mechanical energy from a wind turbine rotor (2) to an electric generator (20). The hydrostatic transmission system (10) comprises a closed loop with a pump (11) and a motor (12) connected by tubes or pipes (13, 14).

In an embodiment of the invention the assembly of said wind turbine rotor (2) and said pump (3) is arranged for rotating about a vertical axis (8) above a swivel (7h) arranged for transferring fluid in the closed loop (10) to and from said motor (12) arranged below said swivel (7h), the power production system (1) further comprising a fluid reservoir (52) arranged for storing additional fluid for the hydrostatic transmission system (10), where the swivel (7h) is further arranged for transferring leakage fluid from the pump (11) to the fluid reservoir (52) arranged below the swivel (7h) in a drain line (62).

A wind turbine power production system with a hydraulic swivel according to the invention allows for the relocation of the generator and the hydraulic motor to the base of the tower. This significantly reduces the weight of the top portion of the tower.

The weight of a 5 MW generator and the associated mechanical gear is typically 50 000 to 200 000 kg. When the centre of the turbine extends 100 to 150 m above the ground or sea level, installation of such systems may become a critical issue. In order to mount the heavy components in the nacelle, large cranes capable of lifting the heavy weight components up to the nacelle may be needed. This problem can be solved by the present invention wherein the heavy weight components can be arranged anywhere in the tower or external to the tower, above or below the tower foundation (or above or below the sea level for off-shore or near shore installations). For near-shore or off-shore installations this is particularly advantageous because of the reduced problems related to the stability of both the crane and the wind turbine power production system that are depending on varying environmental conditions.

It is understood by a person skilled in the art that the weight of a 5 MW turbine, generator and the associated gear and support system at the height of the turbine center which may extend 100 to 150 m above ground or sea level, is the most important factor for dimensioning the tower construction and the foundation or floating support of the tower and turbine. According to the present invention the generator and/or gearbox may be mounted on or below ground or sea level to reduce the weight at the turbine center. The dimensions and associated costs of the tower and the supporting system may therefore be reduced accordingly.

The arrangement of the hydrostatic motor and the generator near the ground or sea level will further significantly ease the accessibility and thereby the supervision and maintenance of these components. The downtime of the mechanical gearbox used in systems according to background art as depicted in FIG. 1 may constitute as much as 30% of the downtime for a conventional wind turbine. Manual inspection and supervision in the nacelle is difficult and has proven dangerous during power production. However, more scheduled maintenance work may be carried out if the components are located on the ground as illustrated in FIG. 3 for the present invention. Repairs and installation of spare parts may also be significantly simpler when the generator and hydraulic motor are easily accessible near the ground (or near sea level). This becomes increasingly important with increasing nominal power delivered from the power production system and thus increasing diameter of the turbine and increasing weight of the generator and components in the nacelle.

In this embodiment of the invention the problems related to continuously pointing the turbine into the changing wind direction without having to turn the turbine back to an initial position after a rotational angle limit is approaching to unwind the power cables between the generator in the rotating nacelle and the electrical termination point in the tower, are solved by arranging a hydraulic swivel between the hydraulic pump and the hydraulic motor. In the background art the turbine has to be rotated back to its initial position after a maximum of 2-3 turns in one direction. This requires a planned and costly production stop and restart. In this embodiment of the invention the hydraulic pump is allowed to rotate with the wind turbine while the hydraulic motor and generator assembly is located near the ground or sea level.

The present invention takes into account the practical problems related to leakage of fluid from the pump and the motor in the system. According to the invention the hydraulic swivel may transfer leakage oil from the pump to a fluid reservoir arranged on or near the ground. Due to the heating of oil in the system fluid reservoirs may become large, and the translocation of such reservoirs from the nacelle to the bottom of the tower, or close to the tower has significant advantages for the deployment and maintenance of the wind turbine, especially for large power production systems off-shore or near-shore, but also for smaller on-shore power production systems where hydraulic transmissions are used for the transfer of energy.

The power production system (1) further comprises a booster pump (51) below the swivel (7h) arranged for pumping supplementary hydraulic fluid from the fluid reservoir (52) to the hydraulic pump (11). In one embodiment of the invention the swivel (7h) is arranged for transferring fluid in the boost line (61). In this embodiment of the invention the boost pump (51) is used to provide supplemental oil that is lost due to internal leakage to the hydraulic pump (11) through a dedicated boost line (61). In an embodiment of the invention supplemental oil from the booster pump (52) may be fed into the low pressure side (14) of the hydrostatic transmission system (10).

In the present invention a swivel is arranged for transferring hydraulic pressure between the hydraulic pump above the swivel and the hydraulic motor below the swivel. The generator is located below the swivel and the wind turbine rotor and hydraulic pump assembly can rotate any number of turns around the vertical axis, and it is not required to bring the turbine rotor back to its initial position.

According to the invention the swivel can be inserted in the closed loop hydraulic system in a number of ways. In one embodiment of the invention the upper part of the swivel is connected with tubes or pipes to the hydraulic pump in the nacelle and the lower part of the swivel is connected to the hydraulic motor with tubes or pipes. The internal fluid channels of the swivel are used for transferring fluid separately in the circuits of the closed loop of the hydrostatic transmission system.

Figure 7:
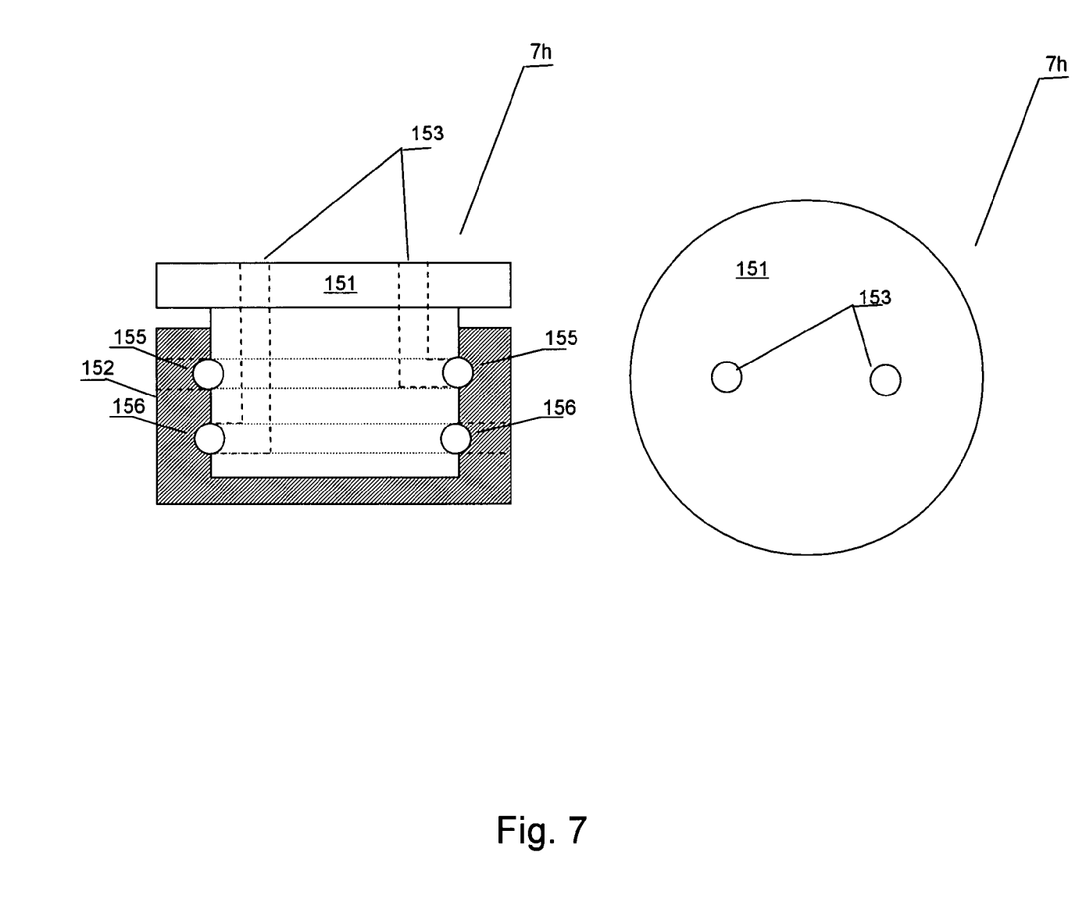
FIG. 7 illustrates a simplified cross-section of a hydraulic swivel. The left hand side of FIG. 7 shows a side view, while the right hand side shows an axial view of the hydraulic swivel.

In FIG. 7, a hydraulic swivel or union that may be used in the invention is shown. The swivel (7h) comprises an outer part (152) and an inner part (151) where the inner part can rotate inside the outer part. Tubular members (153) are arranged for continuously transferring the fluid via circumferential channels (155, 156) through the swivel (7h) when the inner part of the swivel (151) rotates in the outer part (152) of the swivel.

In an embodiment of the invention the tubes or pipes (13, 14) between said pump and said swivel, and said swivel and said motor, are rigid tubes (13, 14). The elasticity of the closed loop is critical for the stability of the hydrostatic system, therefore fixed rigid pipes are preferred over flexible tubes since they do not suffer from deformations the same way that flexible tubes do.

In an embodiment of the present invention the pump shaft (27) of the pump (11) is connected directly to the turbine shaft (28) of said wind turbine rotor (2) without any intermediate gear box. This may reduce the gear transmission loss.

The installation and maintenance costs of gear boxes in wind turbine power production systems are of major concern in the industry. Considering that about 30% of the downtime for a conventional wind turbine is related to the mechanical gearbox, and that the weight of mechanical gear boxes is a major contribution to the overall weight of the nacelle, it is obvious that a power production system without a gearbox will significantly reduce deployment and maintenance costs. The relatively short maintenance-free operating period of mechanical gear-boxes is of particular importance in offshore and near-shore systems where maintenance of components in the nacelle 100-150 m above sea level is further complicated by the difficult environmental conditions in the areas of interest to the wind power industry. Installation and maintenance work is performed from ships or vessels, and depending on the weather conditions, maintenance work in the nacelle may be discouraged due to environmental conditions, since both the maintenance vessel and the wind turbine tower will have relative motion because of pitch, roll, yaw, surge, heave and sway movements. The difficult off shore and near shore conditions may result in even longer downtime for off-shore and near-shore installations than for similar on-shore installations if the gearbox fails.

The present invention reduces this problem significantly by eliminating the gearbox in the nacelle and using the hydrostatic transmission system as the speed-up gear.

The turbine shaft (28) and the pump shaft (27) can be part of the same, common shaft or the two shafts can be welded or coupled by means of a sleeve or by any other proper fastening means as will be obvious to a person skilled in the art.

Figure 4:
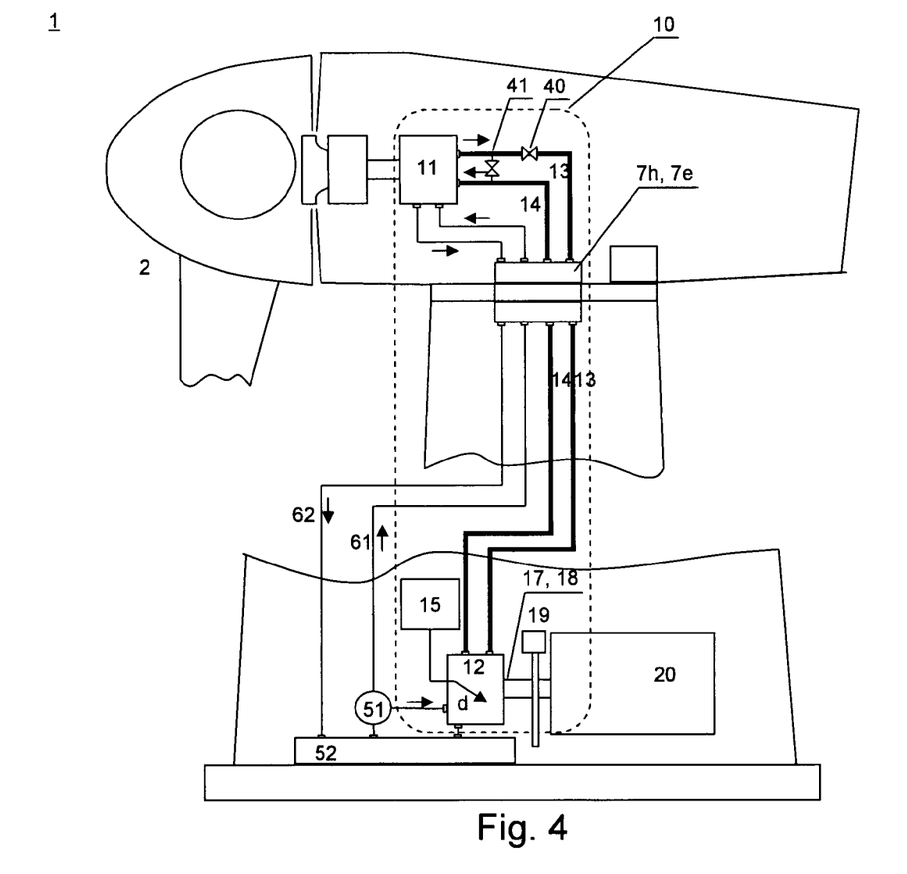
FIG. 4 illustrates a vertical section of a wind turbine power production system similar to FIG. 3, with the difference that the hydraulic disk brake from background art is replaced by a valve flow brake.

In an embodiment of the invention the closed loop comprises one or more valves (40, 41) arranged for stopping the fluid flow in the closed loop system and thereby braking and halting the wind turbine rotor (2) as illustrated in FIG. 4. In this embodiment of the invention the hydraulic brake (19) shown in FIG. 1 may not be required. In general the flow brake according to the invention may be easier to install and maintain due to smaller dimensions and weight.

Figure 6:
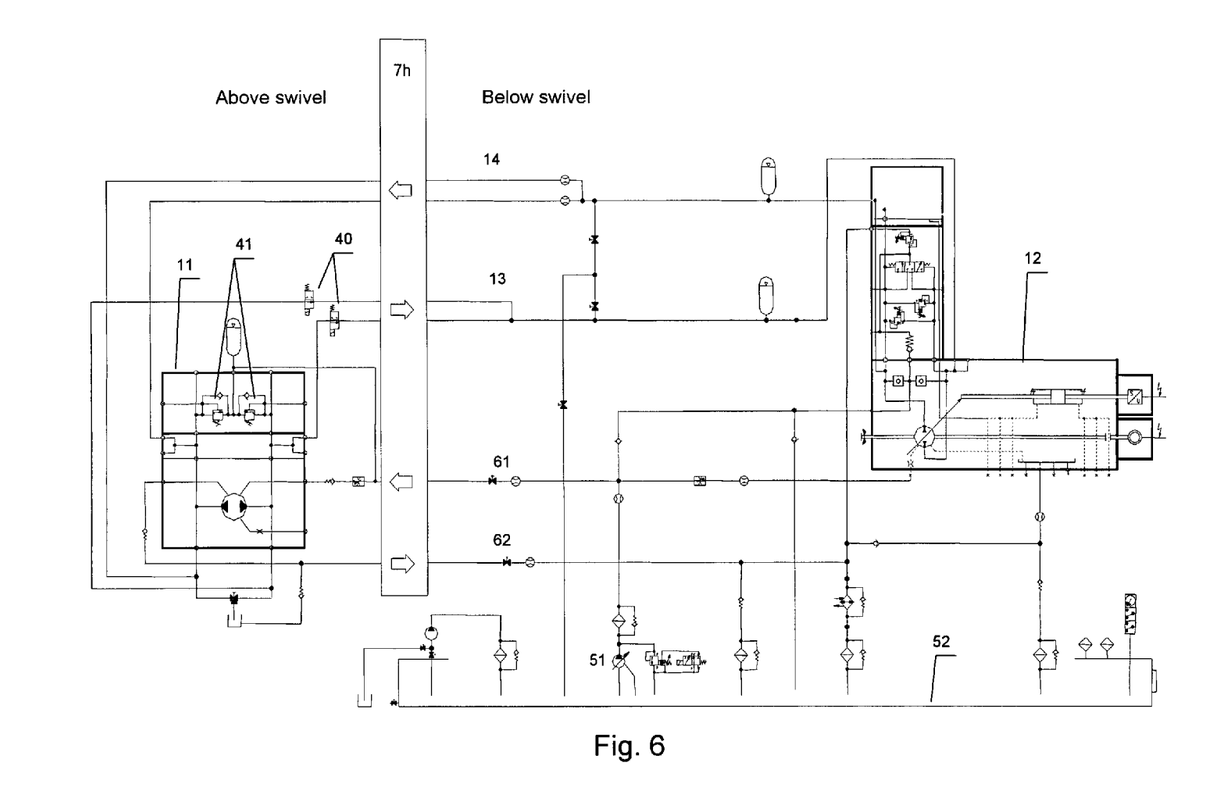
FIG. 6 illustrates a diagram of a wind turbine power production system comprising a hydraulic swivel or union according to an embodiment of the invention.

FIG. 6 shows a diagram of an embodiment of the invention. The hydraulic swivel (7h) near the middle of the diagram is used to transfer fluid in the high pressure side (13) of the closed loop of the hydrostatic transmission system (10) from the hydraulic pump (11) to the hydraulic motor (12). On the lower pressure side (14) the swivel is used to transfer fluid from the hydraulic motor (12) to the hydraulic pump (11). The valves (40) are used for stopping the fluid flow in the high pressure side of the closed loop system. When the valves (40) are closed, the fluid will not be able to pass, and the wind turbine rotor (2) will stop. The pressure relief valves (41) will open when the pressure becomes too high, i.e. when the valves (40) are closed. This ensures that the maximum pressure in the system during braking is set by the opening pressure of the pressure relief valves (41). Further, it is possible to change the pitch angle of the turbine blades to decrease the energy taken up by the wind turbine rotor (2) before applying the flow brake. A small part of the fluid in the closed loop system may be lost due to leakage. In an embodiment of the invention leakage fluid from the pump (11) and the motor (12) may be led to a fluid reservoir (52) arranged closed to the ground. The hydraulic swivel (7h) may be arranged for transferring the leakage fluid to the reservoir (52) in the drain line (62). In an embodiment of the invention the fluid lost in the pump may be replaced by supplemental fluid from a fluid reservoir (52) where the booster pump (51) is arranged for pumping the fluid from the reservoir (52) to the pump (11) through a boost line (61), and the swivel (7h) is arranged for transferring fluid in the boost line (61) from In an embodiment of the invention the motor (12) is arranged on or near the ground. In this embodiment of the invention the pipes or tubes between the swivel (7h) and the hydraulic motor (12) are arranged inside the tower (4) or outside the tower (4) from the swivel (7h) to the motor (12). The motor may be arranged inside the tower, external to the tower or below the base of the tower.

In an embodiment of the invention the motor (12) is arranged near or below the sea surface. In this embodiment of the invention the pipes or tubes between the swivel (7h) and the hydraulic motor (12) are arranged inside the tower (4) or outside the tower (4) from the swivel (7h) to the motor (12). The motor may be arranged inside the tower below or above the sea-surface or external to the tower below or above the sea-surface In an embodiment of the invention the generator shaft (17) of said generator (20) is directly connected to the motor shaft (18) of said motor (12) as shown in FIG. 3. The motor shaft (18) and the generator shaft (17) may be part of the same, common shaft or the two shafts can be welded or coupled by means of a sleeve or by any other fastening means as will be obvious to a person skilled in the art. In this embodiment of the invention the assembly of the hydraulic motor and the generator may be arranged in the same housing inside the tower, external to the tower or below the base of the tower.

In an embodiment of the invention the power production system (1) comprises an electric swivel (7e) arranged for transferring electrical signals.

The electrical signals may comprise electrical power from the turbine base below the swivel to power consuming components in the nacelle, control signals from a control unit to a pitch control actuator, signals from a control unit to a control actuator of the hydraulic pump, measurement signals from one or more sensors to a control unit or any other relevant electrical signals between the nacelle and the turbine base. The dimensions and number of electrical connections in the swivel depends on the application as will be obvious to a person skilled in the art.

Figure 5:
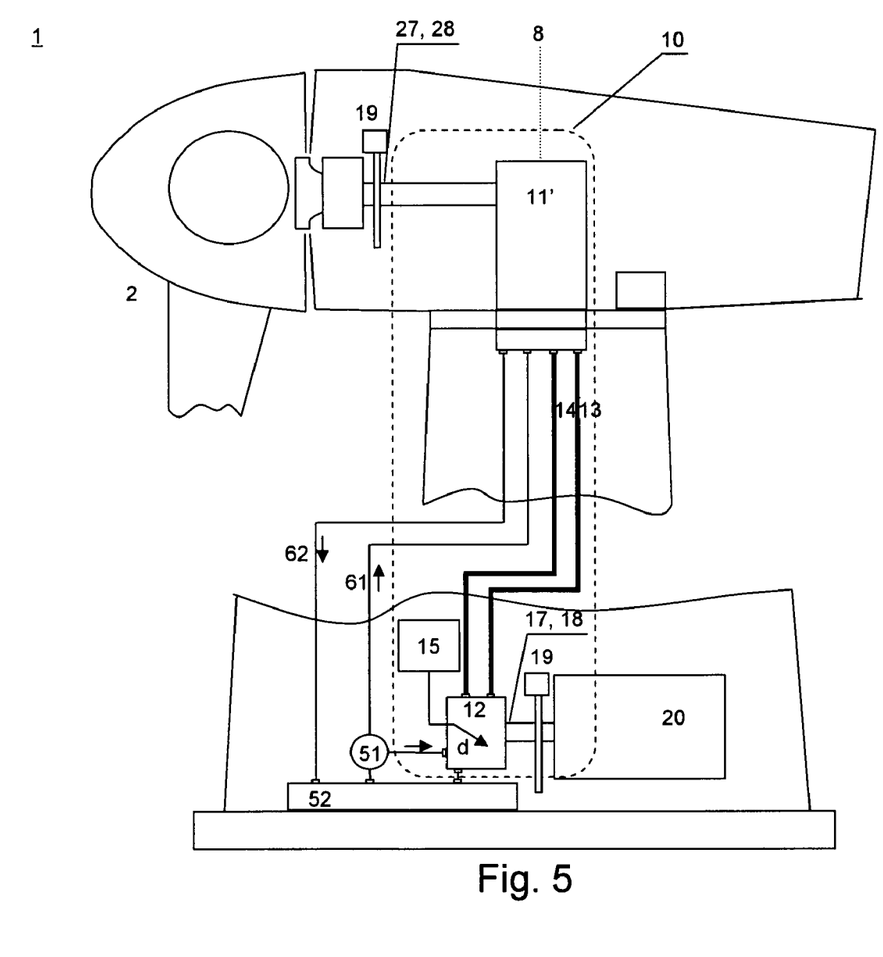
FIG. 5 illustrates a vertical section of a wind turbine power production system similar to FIG. 4 with the main difference that the hydraulic pump and the hydraulic swivel are arranged in one single unit.

In an embodiment of the invention the hydraulic pump (11') comprises the swivel. as shown in FIG. 5. In this embodiment of the invention the hydraulic swivel and hydraulic pump are arranged as a single device without any intermediate external tubes or pipes.

An advantage of this embodiment is that the pump/swivel unit may be lighter and constituted by fewer parts than if the two devices are separate units. The flow brake described above may also be comprised in the same unit.

The reduction in the number of moving parts and the absence of a high ratio mechanical gearbox according to the invention may significantly reduce the acoustic noise generated from the power production system.

The present invention may be applied in all types of wind turbine production systems with a hydrostatic transmission system, such as in onshore, near-shore and offshore power production plants.

The invention claimed is:

1. A wind turbine power production system with a closed loop hydrostatic transmission system for the transfer of mechanical energy from a wind turbine rotor to an electric generator, wherein said hydrostatic transmission system comprises a closed loop with a pump and a motor connected by tubes or pipes (13,14), wherein a pump shaft of said pump is directly connected to a turbine shaft of said wind turbine rotor, the assembly of said wind turbine rotor and said pump is arranged for rotating about a vertical axis, above a swivel arranged for transferring fluid in said closed loop hydrostatic transmission system to and from said motor arranged below said swivel, said power production system further comprising a fluid reservoir arranged for storing additional fluid for said hydrostatic transmission system, said swivel is further arranged for transferring leakage fluid from said pump to said fluid reservoir arranged below said swivel in a drain line.

2. The power production system according to claim 1, wherein said tubes or pipes between said pump and said swivel, and further between said swivel and said motor, are rigid tubes.

3. The power production system according to claim 1, wherein said closed loop comprises one or more valves arranged for stopping the fluid flow in the closed loop system and thereby halting said wind turbine rotor.

4. The power production system according to claim 1 wherein said motor is arranged on or near the ground.

5. The power production system according to claim 1 wherein a generator shaft of said generator is directly connected to a motor shaft of said motor.

6. The power production system according to claim 1, wherein said power production system comprises an electric swivel arranged for transferring electrical signals.

7. The power production system according to claim 1, wherein said hydraulic pump comprises said hydraulic swivel.

8. The power production system according to claim 1 further comprising a booster pump below said swivel arranged for pumping supplementary hydraulic fluid from said fluid reservoir to said hydraulic pump through a boost line, where said swivel is arranged for transferring fluid in said boost line.

9. The power production system according to claim 1 further comprising a booster pump below said swivel arranged for pumping supplementary hydraulic fluid from said fluid reservoir to said low pressure tube or pipe (14) of said hydrostatic transmission system.

10. The power production system according to claim 1 wherein a gear ratio of said hydrostatic transmission system is controlled by a control system arranged for controlling a variable displacement (d) of said hydraulic motor.

* * * * *